US012503418B2

(12) United States Patent
Vogelsang

(10) Patent No.: US 12,503,418 B2
(45) Date of Patent: Dec. 23, 2025

(54) PROCESS FOR THE PREPARATION OF POLYCYCLIC ALIPHATIC DIALDEHYDES

(71) Applicant: OXEA GmbH, Monheim am Rhein (DE)

(72) Inventor: Dennis Vogelsang, Dülmen (DE)

(73) Assignee: OXEA GmbH (DE)

( * ) Notice: Subject to any disclaimer, the term of this patent is extended or adjusted under 35 U.S.C. 154(b) by 394 days.

(21) Appl. No.: 18/036,437

(22) PCT Filed: Nov. 30, 2021

(86) PCT No.: PCT/EP2021/083457
§ 371 (c)(1),
(2) Date: May 11, 2023

(87) PCT Pub. No.: WO2022/117522
PCT Pub. Date: Jun. 9, 2022

(65) Prior Publication Data
US 2024/0043362 A1 Feb. 8, 2024

(30) Foreign Application Priority Data

Dec. 4, 2020 (EP) .................... 20211797

(51) Int. Cl.
*C07C 45/50* (2006.01)
*B01J 31/24* (2006.01)

(52) U.S. Cl.
CPC .......... *C07C 45/50* (2013.01); *B01J 31/2404* (2013.01); *B01J 2231/321* (2013.01); *B01J 2531/004* (2013.01); *B01J 2531/822* (2013.01)

(58) Field of Classification Search
CPC .................................. C07C 45/50
See application file for complete search history.

(56) References Cited

U.S. PATENT DOCUMENTS

| 5,756,854 | A | 5/1998 | Bahrmann et al. |
| 7,015,362 | B2 | 3/2006 | Lappe et al. |
| 7,122,706 | B2 | 10/2006 | Lappe et al. |
| 7,193,116 | B2 | 3/2007 | Möeller et al. |
| 7,301,057 | B2 * | 11/2007 | Dukat ............... C07C 47/347 568/822 |
| 2005/0107640 | A1 | 5/2005 | Lappe et al. |
| 2007/0179323 | A1 | 8/2007 | Springer et al. |

FOREIGN PATENT DOCUMENTS

| CN | 1149043 A | 5/1997 |
| DE | 10 2006 004 317 A1 | 8/2007 |
| DE | 102006004318 A1 | 8/2007 |
| EP | 1529769 A1 | 5/2005 |
| EP | 1529771 A1 | 5/2005 |
| JP | H09124534 A | 5/1997 |
| JP | 2003526688 A | 9/2003 |
| JP | 2005139179 A | 2/2005 |
| JP | 2005139181 A | 2/2005 |
| JP | 2007204470 A | 8/2007 |
| WO | 2004024661 A1 | 3/2004 |

* cited by examiner

*Primary Examiner* — Sikarl A Witherspoon
(74) *Attorney, Agent, or Firm* — M. Susan Spiering; Ochoa & Associates, P.C.

(57) ABSTRACT

The present invention relates to a process for the preparation of polycyclic aliphatic dialdehydes by hydroformylation of polycyclic aliphatic diolefins in the presence of synthesis gas over an organophosphorus ligand modified metal catalyst system having a transition metal of the $8^{th}$-$10^{th}$ subgroup, wherein the hydroformylation is carried out by means of a water-soluble diphosphine or triarylphosphine complex catalyst at a pressure of greater than or equal to 0.5 MPa and less than or equal to 10 MPa and at a temperature of greater than or equal to 70° C. and less than or equal to 150° ° C. in a homogeneous liquid reaction phase, the homogeneous liquid phase comprising at least one non-aqueous solvent, diolefin and/or mono- and/or dialdehydes thereof as reaction products and an aqueous catalyst solution, the proportions of these components in the solution being controlled so as to obtain a single-phase solution under the reaction conditions.

15 Claims, 1 Drawing Sheet

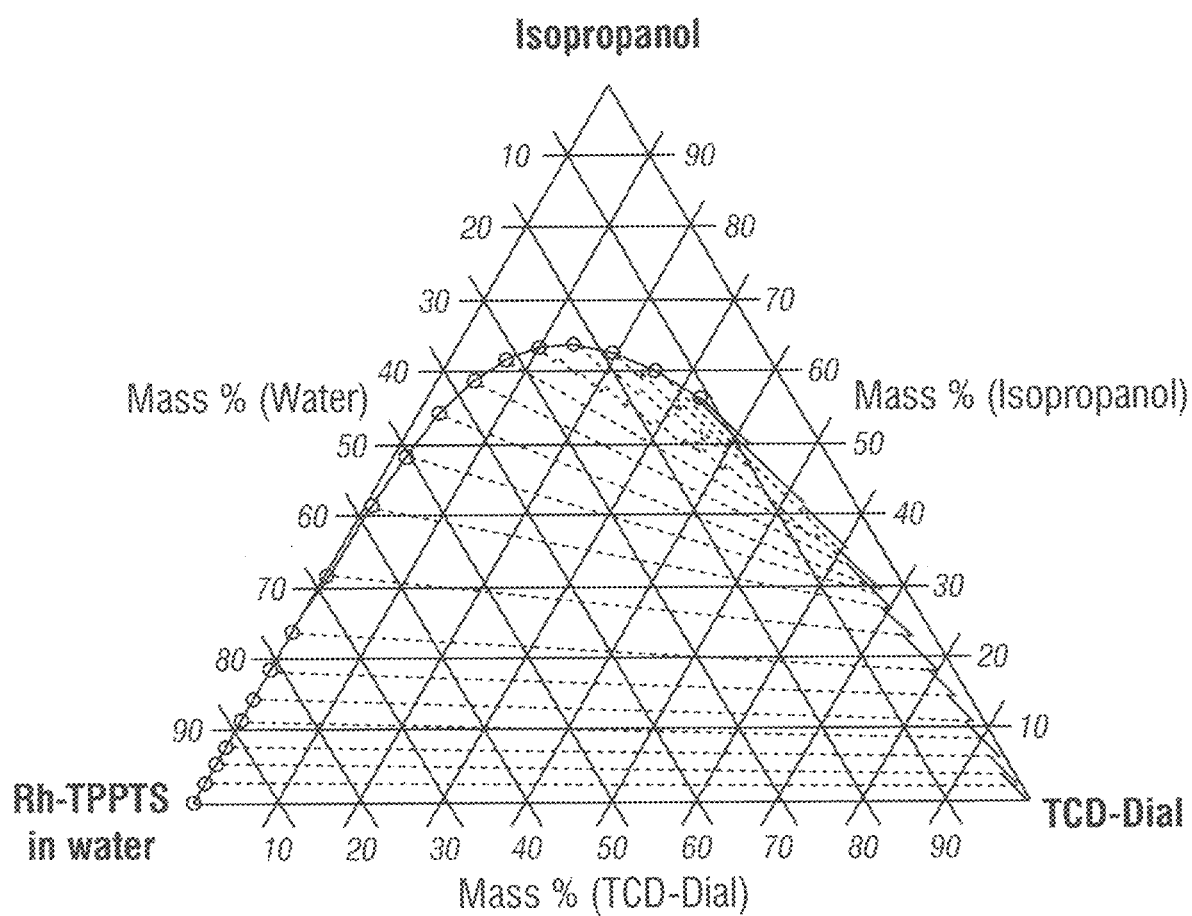

PROCESS FOR THE PREPARATION OF POLYCYCLIC ALIPHATIC DIALDEHYDES

CLAIM FOR PRIORITY

This application is a national phase application based on Application Number PCT/EP2021/083457. Application No. PCT/EP2021/083457, filed Nov. 30, 2021 was based on Application No. EP 20211797.4, filed Dec. 4, 2020. The priorities of the foregoing applications is hereby claimed and their disclosures incorporated herein by reference.

TECHNICAL FIELD

The present invention relates to a process for the preparation of polycyclic aliphatic dialdehydes by hydroformylation of polycyclic aliphatic diolefins in the presence of synthesis gas over an organophosphorus ligand modified metal catalyst system having a transition metal of the $8^{th}$-$10^{th}$ subgroup, said hydroformylation being carried out by means of a water-soluble diphosphine or triarylphosphine complex catalyst at a pressure of greater than or equal to 0.5 MPa and less than or equal to 10 MPa and at a temperature of greater than or equal to 70° C. and less than or equal to 150° C., in a homogeneous liquid reaction phase the homogeneous liquid phase comprising at least one non-aqueous solvent, diolefin and/or mono- and/or dialdehydes thereof as reaction products and an aqueous catalyst solution, the proportions of these components in the solution being controlled so as to obtain a single-phase solution under the reaction conditions.

BACKGROUND

Unsaturated cyclic hydrocarbons with at least two isolated double bonds in the ring structure represent valuable chemical starting products, which can be converted due to their special geometry to functionally exceptional compounds. The ring-shaped hydrocarbon skeleton gives the molecules special properties, which are reflected both in special reaction conditions and in special application functions. Some important representatives of this class of compounds are, for example, cyclopentadiene and dicyclopentadiene (DCP, according to IUPAC tricyclo[5.2.1.0$^{2,6}$]deca-3,8-diene), which can be produced on a large scale by dimerization of cyclopentadiene.

The further functionalization of these compounds by conversion of one or more double bonds to other functional groups is also known and described in the literature. For example, the double bonds can be converted to aldehydes by catalytic addition of carbon monoxide and hydrogen in the course of hydroformylation. While in the past this conversion was carried out almost exclusively with cobalt catalysts, modern processes work with metal catalyst systems based on transition metals of the $8^{th}$-$10^{th}$ subgroup. As a function of the specially selected reaction conditions, these catalysts are used alone or together with complexing ligands, for example organic phosphines or esters of phosphorous acid. In the opinion of those skilled in the art, hydridocarbonyl-compounds of the metal M are effective under the reaction conditions, which can be represented, for example, for rhodium by the general formula H[Rh(CO)$_{4-x}$L$_x$], where L denotes an organic ligand and x is 0 or an integer from 1 to 3. The reaction products obtained in the case of the reaction of DCP are either the mono- or dialdehyde, the latter of which can be further converted by a final hydrogenation step to the economically important diol tricyclo[5.2.1.0$^{2,6}$]decanedimethanol.

Some hydroformylation processes for the conversion of cyclic olefins to the corresponding aldehydes and, if necessary, a further conversion of the aldehydes to the corresponding alcohols are also given in the patent literature.

For example, DE 10 2006 004 318 A1 describes a process for the preparation of 3(4),7(8)-dihydroxymethyl-bicyclo[4.3.0]nonane by hydroformylation of bicyclo[4.3.0]nona-3,7-diene with subsequent hydrogenation, wherein bicyclo[4.3.0]nona-3,7-diene is reacted with synthesis gas in homogeneous organic phase in the presence of transition metal compounds of Group VIII of the Periodic Table of the Elements containing organophosphorus compounds in a complex bond and excess organophosphorus compound at temperatures of 70 to 160° C. and pressures of 5 to 35 MPa, and the 3(4), 7(8)-bisformyl-bicyclo[4.3.0]nonane is then hydrogenated to give the 3(4), 7(8)-dihydroxymethyl-bicyclo[4.3.0]nonane.

EP 1 529 771 A1 also discloses a process for the preparation of 8(9)-formyl-tricyclo[5.2.1.0$^{2,6}$]dec-3-ene by hydroformylation of dicyclopentadiene in a heterogeneous reaction system using an aqueous solution, water-soluble organic phosphorus(III) compounds in complex bonding containing transition metal compounds of Group VIII of the Periodic Table of the Elements at temperatures of 70 to 150° C. and pressures of 0.5 to 10 MPa with synthesis gas, wherein special sulfonated triarylphosphines are used as water-soluble organic phosphorus(III) compounds.

Furthermore, WO 2004 024 661 A1 describes a process for the catalytic hydroformylation of olefinically unsaturated compounds containing 3 to 24 carbon atoms, wherein at least one unmodified catalyst containing a metal of group 8 to 10 of the periodic table of the elements is used as the catalyst, wherein the hydroformylation is carried out in the presence of a cyclic carbonic acid ester of the following formula

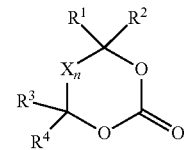

R$^1$, R$^2$, R$^3$, R$^4$: in each case identical or different: H, substituted or unsubstituted, aliphatic, alicyclic, aromatic, aliphatic-alicyclic, aliphatic-aromatic, alicyclic-aromatic-hydrocarbon radicals having 1 to 27 carbon atoms.
n: 0-5
X: A divalent substituted or unsubstituted, aliphatic, alicyclic, aromatic, aliphatic-alicyclic, aliphatic-aromatic hydrocarbon radical having from 1 to 27 carbon atoms.
is carried out, the proportion of the carbonic acid ester being at least 1% by weight of the reaction mixture.

Such solutions known from the prior art may offer further potential for improvement, in particular with regard to the efficiency of the conversion as well as the service life of the catalyst material used.

SUMMARY OF INVENTION

It is therefore the object of the present invention to overcome the disadvantages known from the prior art at least partially. In particular, it is the object of the present invention to provide a process which yields high conversions and selectivities with low catalyst concentrations over long reaction periods, under very moderate reaction conditions.

The problem is solved by the features of the independent process claim. Preferred embodiments of the invention are indicated in the dependent claims, in the description or in the figures, whereby further features described or shown in the dependent claims or in the description or in the figures may individually or in any combination constitute an object of the invention, unless the opposite clearly follows from the context.

In accordance with the invention, the problem is solved by a process for the preparation of polycyclic aliphatic dialdehydes by hydroformylation of polycyclic aliphatic diolefins in the presence of synthesis gas over an organophosphorus ligand-modified metal catalyst system with a transition metal of the $8^{th}$-$10^{th}$ subgroup, wherein the hydroformylation is carried out by means of a water-soluble diphosphine or triarylphosphine complex catalyst at a pressure of greater than or equal to 0.5 MPa and less than or equal to 10 MPa and at a temperature of greater than or equal to 70° C. and less than or equal to 150° C., in a homogeneous liquid reaction phase, the homogeneous liquid phase comprising at least one non-aqueous solvent, diolefin and/or mono- and/or dialdehydes thereof as reaction products and an aqueous catalyst solution, the mass ratios of these components in the solution being controlled so as to obtain a single-phase solution under the reaction conditions.

Surprisingly, it was found that hydroformylation of polycyclic dienes to the corresponding dialdehydes can be carried out highly efficiently under moderate process conditions with a particularly stable and selective catalyst system, even for longer process times. The basis for these advantages is that the reaction is carried out in a homogeneous liquid phase comprising both organic and aqueous components. By adjusting at least the amounts of the indicated components catalyst solution, reactant or intermediate or final products formed therefrom, and solvent, the overall solution can be maintained in a single phase region of the phase diagram, and surprisingly, the water-soluble catalyst is homogeneously distributed in this solution and can be contacted unhindered by the reactants and synthesis gas. Within the homogeneously single-phase region, there are not two separate phases, for example an aqueous phase comprising the catalyst solution, and an organic phase separate therefrom comprising the products or the intermediates, but only a single, homogeneously mixed aqueous/organic phase. By controlling the amounts of the different, at least partially miscible, individual components, the entire reaction can be safely be carried out in a single phase and, surprisingly, this leads to the fact that the reaction does not stop at the stage of monoaldehyde, but proceeds highly selectively and at a high reaction rate up to dialdehyde. This result is surprising, since water-soluble catalysts in a "two-phase" reaction environment only lead to a single conversion and the reaction "stops" at the stage of the monoaldehyde. If, on the other hand, one considers reactions in purely organic phase, i.e. without the addition of aqueous or water-soluble components, high conversions can result under good selectivities. In sum, it should be possible to deduce from these two different processes of the prior art that the entry of the gaseous reaction components and the reaction on the catalyst in the presence of aqueous additives or, overall, the use of water-soluble catalysts should tend to lead to a deterioration of the synthesis. The latter applies in particular to the reaction of cyclic dienes with a rigid ring structure, which makes efficient attachment to the catalyst systems much more difficult. However, such a deterioration surprisingly does not arise even for the challenging reactants considered here. Furthermore, the combination of water-soluble catalysts in conjunction with a homogeneous organic/aqueous phase seems to contribute to a particular protection of the catalyst system in the reaction, so that it is advantageous to work with very small amounts of catalyst, which also have long lifetimes.

The process according to the invention is a process for the preparation of polycyclic aliphatic dialdehydes. Polycyclic aliphatic dialdehydes have at least two non-aromatic ring structures and a total of at least two aldehyde groups, wherein at least one of the aldehyde groups is located directly on the ring structure. Preferably, both aldehyde groups may also be directly attached to the ring structure. The entire aliphatic ring structure may have, for example, 5 to 20 C atoms and the molecular weight of the preparable dialdehydes may be, for example, between 50 g/mol and 500 g/mol. Possible representatives of this dialdehyde group may be, for example, tricyclodecane dicarbaldehyde or dicylopentane dicarbaldehyde.

The conversion of the reactants to the products is carried out by hydroformylation of polycyclic aliphatic diolefins in the presence of synthesis gas. The dialdehydes are obtained by a reaction of polycyclic aliphatic dienes having at least two non-aromatic cycles and at least two non-adjacent double bonds. These reactants may, for example, have a molecular weight greater than or equal to 50 g/mol and less than or equal to 450 g/mol. In addition to the double bonds, the diolefin may optionally have other functional groups. Possible representatives of the group of usable aliphatic polycyclic dienes are dicyclopentadiene, tricyclopentadiene, norbornadiene, and so on. The mass transfer of the mentioned polycyclic aliphatic diolefins is limited in a heterogeneous reaction mixture consisting of water and organic phase. Homogenization according to the process of the invention allows to overcome the mass transfer limitation occurring in two-phase systems.

The synthesis gas comprises hydrogen and carbon monoxide, and the composition of the synthesis gas, i.e., the ratio of carbon monoxide to hydrogen, can be varied. The molar ratio of hydrogen to carbon monoxide usually ranges between 1:10 and 10:1, mixtures comprising hydrogen and carbon monoxide in a molar ratio of 3:1 to 1:3, in particular about 1:1, are particularly suitable. For each mole of diolefin, 1 to 12, in particular 1.2 to 10, preferably 1.5 to 8 moles of carbon monoxide and 2 to 24, in particular 2.4 to 20 and preferably 3 to 16 moles of hydrogen can be used. It has proved useful to work with an excess of 10 to 200, in particular 25 to 120, moles of carbon monoxide and 20 to 400, in particular 50 to 200, moles of hydrogen per mole of diolefin.

The reaction of the reactants to the aldehydes is carried out over a metal catalyst system modified with organophosphorus ligands comprising a transition metal of the $8^{th}$-$10^{th}$ subgroup. The catalyst used or the catalyst system forming in the reaction solution comprises at least one transition metal of the $8^{th}$-$10^{th}$ subgroup of the periodic table of the elements, such as, for example, cobalt, rhodium, iridium. In addition to the metal, the catalyst has at least one or more organic ligands with a phosphorus atom in its coordination sphere or coordinates them in the reaction solution under the reaction conditions. Organophosphorus ligands in this case have a carbon backbone with or without further functional groups and at least one or two covalently bonded phosphorus atoms. The catalytically active catalyst system is further formed under the reaction conditions by further addition of hydrogen and carbon monoxide in the reaction solution, the components of the synthesis gas forming a coordinative complex with the metal. However, it is also possible to first preform the catalyst and then feed it to the actual hydroformylation stage. In this case, the preforming conditions generally correspond to the hydroformylation conditions.

The hydroformylation is carried out by means of a water-soluble triarylphosphine or a water-soluble diphosphine complex catalyst. The complex catalyst comprises water-soluble organic phosphorus compounds as ligands in its coordination sphere in the reaction solution. For example, water-soluble organic phosphorus compounds may be phosphorus(III) compounds represented by the general formula:

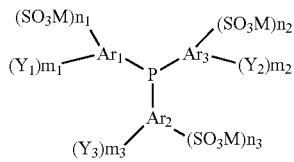

can be used. In this formula, $Ar_1$, $Ar_2$ and $Ar_3$ represent the same or different aryl groups having 6 to 14 carbon atoms. The substituents $Y_1$, $Y_2$ and $Y_3$ represent identical or different straight-chain or branched alkyl or alkoxy groups having 1 to 4 carbon atoms, chlorine, bromine, hydroxyl, cyanide or nitro groups, and furthermore amino groups of the formula $NR^1R^2$, where the substituents $R^1$ and $R^2$ may be identical or different and represent hydrogen, straight-chain or branched alkyl groups having 1 to 4 carbon atoms. The counter cations M may represent lithium, sodium, potassium, magnesium, calcium or barium, where m1, m2 and m3 may be identical or different and represent integers from 0 to 5, in which n1, n2 and n3 are identical or different and represent integers from 0 to 3, at least one of the numbers n1, n2 and n3 being equal to or greater than 1. A triarylphosphine complex catalyst is a water-soluble triarylphosphine complex catalyst when the solubility of the complex in water at 20° C. is greater than or equal to 100 g/L. The solubility in water can be determined, for example, using the OECD Guidelines for the Determination of Solubility in Water ("Water Solubility" of 27 May 1995).

The water-soluble triarylphosphines of the above formula preferably include those triarylphosphines in which the groups $Ar_1$, $Ar_2$, $Ar_3$ are phenyl groups; $Y_1$, $Y_2$ and $Y_3$ represent a methyl group, an ethyl group, a methoxy group, an ethoxy group and/or a chlorine atom. The cationic moieties M of the inorganic cations may preferably be sodium, potassium, calcium and barium. In particular, suitable water-soluble triarylphosphines may be those in which $Ar_1$, $Ar_2$, $Ar_3$ each represent a phenyl group; m1, m2, m3 are 0, n1, n2 and n3 are 0 or 1 and n1+n2+n3 together account for 1 to 3, wherein the sulfonate groups may preferably be in the meta position. The ligands may be used as such or as mixtures. Suitable examples of water-soluble triarylphosphine ligands include (sulfophenyl)-diphenylphosphine, di-(sulfophenyl)phenylphosphine and tri(sulfophenylphosphine). In the prior art, (sulfophenyl)diphenylphosphine is abbreviated as TPPMS, di-(sulfophenyl)phenylphosphine is abbreviated as TPPDS, and tri(sulfophenyl)phosphine is abbreviated as TPPTS.

Sulfonated diphosphines of the general formulae (III) and (IV) are also suitable as water-soluble diphosphines.

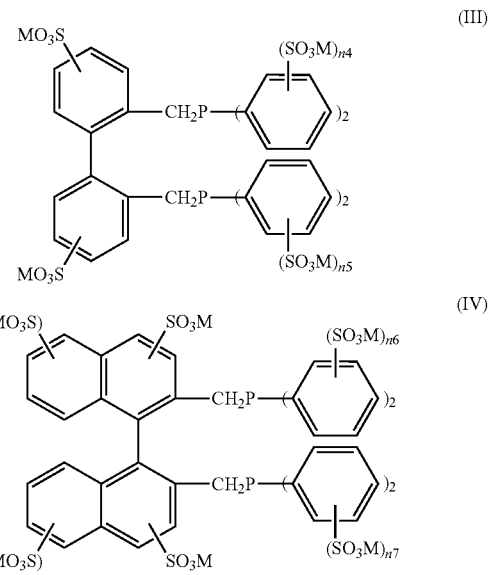

In (III), each $n_4$ and $n_5$ independently represents 0 or 1, and the compound of formula (III) may contain up to six —$SO_3M$ groups.

In (IV), each $n_6$, $n_7$, $n_8$ and $n_9$ are independently 0 or 1, wherein the compound of formula (IV) contains from four to eight —$SO_3M$ groups.

In formulae (III) and (IV), M represents ammonium, a monovalent metal or the equivalent of a polyvalent metal, in particular sodium, potassium, calcium or barium.

The catalyst metal concentration may be from 20 to 1000 ppm by weight, preferably from 50 to 800 ppm by weight and more preferably from 100 to 600 ppm by weight based on the total amount of aqueous catalyst solution. Although it is possible to use as catalyst the stoichiometrically composed metal-phosphorus ligand complex compound, one usually works in the presence of excess phosphorus ligands, i.e., ligand which has not formed a complex bond with the metal used. For each mole of metal, one can preferably use 10 to 300 moles of phosphorus in the form of the water-soluble organic phosphorus ligands. Molar ratios of metal to organic phosphorus ligand in the range of 1:50 to 1:150 have proved particularly useful. The metal-phosphorus complex catalyst need not have a uniform composition, but may, for example, comprise a mixture of transition metal complex compounds which differ in the nature or stoichiometric composition of the phosphorus ligands. Similarly, the free phosphorus ligand contained in the aqueous catalyst solution may be composed of a mixture of different water-soluble organic phosphorus compounds.

The hydroformylation is carried out at a pressure of greater than or equal to 0.5 MPa and less than or equal to 10 MPa and at a temperature of greater than or equal to 70° C. and less than or equal to 150° C. The conversion according to the invention is carried out within short process times under pressures rather low for hydroformylation reactions. This may help to reduce the necessary investment in plant equipment. Preferably, the selected total pressure may extend over a range of 0.5 to 10 MPa, further preferably 1 to 8 MPa and more preferably 1.5 to 6 MPa. Preferably, temperature ranges from 100 to 150° C. and more preferably from 110 to 140° C. can be maintained.

The reaction is carried out in a homogeneous liquid reaction phase, the homogeneous liquid phase comprising at least one non-aqueous solvent, diolefins and/or their mono- and/or dialdehydes as reaction products and an aqueous catalyst solution. With the selected composition of solvent, aqueous catalyst solution, the polycyclic diolefin and the intermediates and end products formed therefrom in the course of the reaction, a homogeneous liquid phase is formed at the reaction site within the specified pressure and temperature range over the entire reaction sequence. In this homogeneous liquid phase, the synthesis gas is admitted and, with this, the further conversion of the unsaturated bonds to the corresponding aldehydes takes place at the catalyst. This means that at the reaction site, in particular, there is not a two-phase, separate aqueous and organic fraction, the two phases forming a common phase boundary. The presence of a common homogeneous phase can be calculated thermodynamically from the proportions, an example result of the calculations is given in FIG. 1, and can be visually understood when carrying out the reaction. In addition to the constituents mentioned, the homogeneous phase may also comprise excess ligands and/or higher molecular weight by-products.

The mass ratios of the reactants, the solvent and the aqueous catalyst solution are controlled in the solution such that a single phase solution is provided under the reaction conditions. By determining the mass ratios between the reactant, as well as the aqueous catalyst solution and the solvent, single-phase solutions can be provided at the reaction site under the selected temperature and pressure conditions, in which the reactions with the synthesis gas according to the invention proceed particularly advantageously. Controlling the single-phase nature here means that either at the start of the reaction the mass ratios of the components are predetermined in such a way that a single-phase nature of the solution is achieved under the reaction conditions. Since, by nature, no intermediate or final products are yet present at the start of the reaction, the changes in composition as a function of the progress of the reaction must of course be taken into account. For this purpose, for example, a point in the phase diagram, as shown for example in FIG. 1, can be selected which lies in the single-phase region both at the beginning and after complete conversion of the reactants. However, it is also possible to actively control the composition during the course of the reaction so as to work in the single-phase region. This can be done, for example, by actively adding or removing solvent to the solution. The same can also be done via the aqueous component, either adding new catalyst solution or just water to the reaction site. Less preferred is the in principle possible control of the single-phase or two-phase via the temperature and the system pressure.

Preferred solvents may be liquids which have at least some solubility with water. This solubility of the solvent in water may be greater than or equal to 20 g/L at 20° C., for example. The use of solvents in this solubility ratio to water may help to obtain particularly robust single-phase regions, which can also reliably compensate for pressure and/or temperature variations that may occur. In addition, the use of such a group of solvents may help to compensate for large changes in composition due to the formation of products. Furthermore, the proportion of solvents can be kept sufficiently small, which facilitates the separation of the resulting mixture and keeps energy costs for separation low.

Further details are provided in the following description and attached Drawing.

BRIEF DESCRIPTION OF DRAWING

FIG. 1 shows the result of the calculated phase behaviour of a three-component mixture as a function of composition at a temperature of 120° C. The components are the aqueous solution of a Rh-TPPTS complex catalyst (bottom left), isopropanol as solvent (top) and the final product TCD dial (bottom right).

DETAILED DESCRIPTION

In a preferred embodiment of the process, the polycyclic aliphatic diolefin may be selected from the group consisting of bicyclic or tri-cyclic dienes or mixtures thereof. It has been found to be particularly advantageous that, within the process according to the invention, cyclic diene reactants with internal double bonds which are sterically difficult to react are completely converted to dialdehydes which, due to their rigid ring structure, react significantly worse in solution with the catalyst complexes than, for example, short aliphatic chains. The polycyclic, olefinic aliphatics can only be converted very incompletely in two-phase areas by conventional process control due to their low solubility in the aqueous catalyst phase. Single-phase reactions in purely organic solvents are possible, but lead to increased problems in the purification of the products obtained. Furthermore, the latter reactions show problems in the catalyst recovery as well as its lifetime. For example, in reactions in purely organic solvents, unmodified (without addition of ligands) metal catalysts are also used for the reaction of the diolefins mentioned herein, for which a high catalyst input is required and the catalyst is not recycled. Using ligand-metal complexes as catalysts, the desired activities are often not achieved for the hydroformylation of the polycyclic diolefins. The bi- or tri-cyclic dienes which can be reacted according to the invention comprise two or three closed, non-aromatic rings and may further preferably have a molecular weight of greater than or equal to 60 g/mol and less than or equal to 450 g/mol.

In a further preferred embodiment of the process, the polycyclic aliphatic diolefin may be selected from the group consisting of dicyclopentadiene or norbornadiene. By means of the reaction according to the invention, polycyclic aliphatic olefins which are particularly difficult to react sterically and which are poorly soluble in water, such as tricyclo[5.2.1.0$^{2,6}$]deca-3,8-diene and bicyclo[2.2.1]hepta-2,5-diene, can be reacted particularly efficiently. High conversions at high selectivities are achieved, and the catalyst system can also exhibit a particularly long service life.

In a preferred embodiment of the process, the temperature and pressure can be kept constant during the reaction and the single phase of the reaction solution can be adjusted via the mass ratios of solvent to aqueous catalyst solution. It has also been found advantageous that the desired single-phase range is essentially adjusted via the mass ratio between aqueous catalyst solution, the reactant and the solvent. "Safe" ranges can be obtained here, so that the change in composition in the course of the reaction due to the formation of the intermediate and/or final products, the formation of higher molecular weight by-products and/or a change in the organic phosphorus ligands can be safely compensated. In addition, the choice of suitable solvents and the amount thereof in relation to the aqueous catalyst solution can also be used to compensate for any temperature and/or pressure fluctuations that may occur. Via this determination, the reaction in its entirety can be reliably maintained in the single-phase range. Further preferably, this control can be determined by the choice of the amounts of solvent and aqueous catalyst solution at the beginning of the reaction.

In a further preferred characteristic of the process, the solvent may be selected from the group consisting of straight-chain or branched C2-C5 alcohols or mixtures of at least two alcohols from this group. In particular, the short-chain alcohols have been found to be especially suitable for obtaining particularly efficient conversions in a single-phase region. By means of these solvents, reactants which are difficult to hydroformylate can also be highly selectively reacted within very short process times on water-soluble catalysts. The service life of the catalysts can also be significantly extended by this choice of solvent. These solvents show a low binding affinity to the metal compared to the ligand. At the same time, however, they can have a stabilizing effect on the ligand and thus protect it from degradation. Another advantage is that very robust single-phase regions can be achieved with only a small amount of solvent, which reduces the costs of working up and separating the desired products. The low boiling points of the selected solvents are also advantageous, allowing them to be easily separated from the reaction system.

Within a preferred aspect of the process, the solvent may be isopropanol. The use of isopropanol for the single-phase conversion of polycyclic dienes in a hydroformylation process has been found to be particularly favorable. By adding isopropanol, even reactants that are difficult to hydroformylate can be highly selectively converted within very short process times on water-soluble catalysts. The service life of the catalysts can also be significantly extended by this solvent. Another advantage is that very robust single-phase regions are formed with only a small amount of isopropanol, which reduces the costs of processing and separating the desired products. In addition, due to the physical differences of the isopropanol to the aldehyde products, a particularly simple and complete separation after the end of the reaction can be achieved.

In a preferred embodiment of the process, the metal catalyst may be present in a concentration of greater than or equal to 0.05 mol and less than or equal to 0.75 mol in the reaction solution. The single-phase reaction can also be used to achieve efficient process control, which can be achieved with significantly lower amounts of catalyst. With these low contents, highly selective conversions can be obtained within short reaction times. Without being bound by theory, this is most likely also achieved by the fact that a stronger degradation of the catalyst ligands and thus also of the catalyst system itself is prevented or at least reduced via the single-phase reaction control. Furthermore, by modifying the polarity of the solution, a particularly efficient access of the synthesis gas is obtained, which can contribute to particularly fast reactions. Without being bound by theory, a mixture of water and isopropanol may also be particularly suitable for preventing premature degradation of the water-soluble organic ligands at very low catalyst concentrations used. Preferably, the catalyst may be present in the reaction solution at a concentration greater than or equal to 0.1 mol/L and less than or equal to 0.65 mol/L, further preferably greater than or equal to 0.2 mol/L and less than or equal to 0.55 mol/L.

Within a further preferred aspect of the process, the reaction can be carried out at a pressure of greater than or equal to 2.5 MPa and less than or equal to 7.5 MPa, preferably from greater than or equal to 3 MPa to less than or equal to 7 MPa and in particular from greater than or equal to 3.5 MPa to less than or equal to 6.5 MPa. Surprisingly, for the conversion of difficult reactants, reaction control in a particularly low-pressure range has also been found to be particularly favourable. Despite the sterically challenging reactants, their poor solubility and the desired complete conversion of both double bonds, the aqueous component in the single-phase region does not appear to inhibit the entry of the synthesis gas, so that overall even lower pressures can ensure sufficient gas entry into the reaction solution.

Within a preferred embodiment of the process, the mass ratio of aqueous catalyst solution to solvent, expressed as mass of catalyst solution divided by mass of solvent, may be greater than or equal to 0.25 and less than or equal to 4. In the overall single-phase reaction solution, the above mass ratio has been found to be particularly safe and advantageous. This mass ratio can also be used to reliably compensate for unavoidable fluctuations in pressure and temperature due to the process, and for changes in composition due to the formation of the products. Further advantageously, a relatively small amount of solvent additive of greater than or equal to 0.5 and less than or equal to 2, but in particular greater than or equal to 0.75 and less than or equal to 1.5, can be obtained relative to the mass of the catalyst solution. This low solvent addition can contribute to a more efficient work-up of the reaction solution after the end of the reaction.

In a preferred aspect of the method, the reaction may be carried out at a temperature of greater than or equal to 120° C. and less than or equal to 150° C. Despite the increased reactivity due to running in the single-phase range, the temperature interval indicated above has been found to be advantageous, in particular at a temperature greater than or equal to 125° C. and less than or equal to 140° C. In this range, particularly rapid and selective conversions are obtained, and in particular the proportion of high boilers formed also remains very low. In addition, catalyst lifetimes are significantly prolonged, which can probably be attributed to a reduced degradation of the organic ligands.

In a further preferred embodiment of the process, the complex catalyst may comprise triarylphosphine ligands and a catalyst metal, wherein the molar usage ratio of triarylphosphine ligands to catalyst metal, expressed as moles of triarylphosphine ligands divided by moles of catalyst metal, is greater than or equal to 3 and less than or equal to 15. For the reactions in the single-phase range, it has been found advantageous to keep the ratio of organic ligands to catalyst metal within a narrow range, preferably greater than or equal to 5 and less than or equal to 12 and in particular greater than or equal to 7 and less than or equal to 10. Within these ratios, very reproducible conversions with high selectivities are obtained. This is probably because a lower ligand concentration allows higher activities of the catalyst. At the same time, the degradation of the organic ligand in the single-phase solution is delayed or even completely prevented. Thus, this process control can contribute to the catalyst being used more frequently and for a longer period of time.

In a further preferred embodiment of the process, the synthesis gas may have a molar CO to $H_2$ ratio, expressed as moles of CO divided by moles of $H_2$, of greater than or equal to 0.5 and less than or equal to 2. Due to the improved access of the synthesis gas to the homogeneous single-phase reaction solution, the above synthesis gas composition can be used to particular advantage in the context of this implementation. Usually, other ratios are used, which takes into account the fact that CO can diffuse more poorly between the different phases within a two-phase process. Thus, in addition to increasing the reaction rate, it is also possible to work very resource-efficiently.

Within a further embodiment of the process, the pH of the aqueous catalyst solution may be greater than or equal to pH 4 and less than or equal to pH 10. It has been found that by adjusting the pH in the preferred range, the catalyst comprising the transition metal and the water-soluble organophosphorus ligand has very high activity and high selectivity with respect to product formation. The adjustment can be carried out by known adjusting agents such as inorganic acids or bases on the catalyst solution used. However, it is also possible and advantageous that the homogeneous phase forming by means of the aqueous catalyst solution used is maintained at the pH range described. Furthermore, low decomposition of the catalyst has been observed with the preferred pH adjustment. In a further preferred embodiment, the pH can be adjusted between greater than or equal to pH 5 and less than or equal to pH 8, further preferably between greater than or equal to pH 5.5 and less than or equal to pH 7.

In a preferred embodiment of the process, the molar ratio of water in the aqueous catalyst solution used to catalyst metal, expressed as moles of water divided by moles of catalyst metal, may be greater than or equal to 5000 and less than or equal to 60000. Despite the fact that the access of organic reactants to the catalyst should be enhanced by a more organic environment, the above water to catalyst ratio has been found to be particularly favourable. With these proportions of water, complete conversions to the dialdehydes are achieved for diene reactants and the process control can also be safely designed as a single phase. In addition, fluctuations in the reaction conditions can be safely compensated without leaving the single-phase phase region.

In a further preferred characteristic of the process, the molar ratio of catalyst metal to polycyclic aliphatic diolefin, expressed as moles of catalyst metal to moles of diolefin, may be greater than or equal to 0.05% and less than or equal to 0.75%, preferably greater than or equal to 0.15% and less than or equal to 0.65%, in particular greater than or equal to 0.3% and less than or equal to 0.5%. The single-phase reaction control also allows to operate very efficiently with a particularly low catalyst to olefin feedstock ratio. Complete conversions to the dialdehydes are achieved within short reaction times, and the catalyst lifetimes can also be longer compared to the state-of-the art solutions.

Within a preferred embodiment of the process, at least one ligand of the water-soluble triarylphosphine complex catalyst may comprise a triphenylphosphine-3,3',3"-trisulfonic acid sodium salt. The use of these triphenylphosphine ligands has been found to be particularly advantageous for working in the single-phase region. In addition to a highly selective conversion to the dialdehydes, particularly low amounts of high boilers are formed, even with long reaction times. This is particularly the case when isopropanol is used as the solvent, and in these cases, there is particularly low degradation of the organic ligand.

EXAMPLES

In a hydroformylation according to the invention, dicyclopentadiene DCDP is converted to the corresponding dialdehyde by means of an organically modified rhodium complex catalyst in a reaction solution according to the following reaction equation:

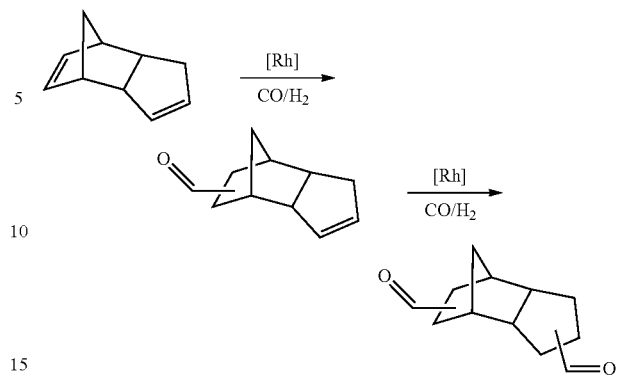

The catalyst used is a water-soluble complex catalyst comprising organophosphorus ligands according to the following formula:

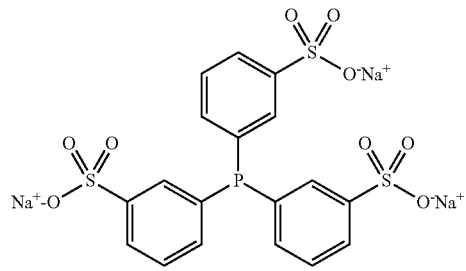

Isopropanol is used as solvent to achieve the single phase of the reaction system. The reaction is carried out at 130° C. and a pressure of 5 MPa in a stirred reactor vessel (800 rpm) within a reaction time of 3 h.

The input quantities of the reactants are as follows:

| Component | Application quantity |
| --- | --- |
| Total rhodium concentration in aqueous catalyst solution | 46380 mg/l |
| Amount of aqueous catalyst solution | 2.32 ml |
| Rhodium in mol | 1.04 mmol |
| Ligand in g | 18.38 g |
| Ligand in mol | 568 mmol |
| P/Rh ratio | 10:1 |
| Olefin in % based on total input | 10% |
| Olefin in g | 30.0 g |
| olefin in mol | 0.227 mol |
| Rhodium quantity based on olefin | 0.46% |
| Application quantity Isopropanol | 135 g |
| Application quantity water | 135 g |
| Synthesis gas composition $H_2$:CO | 1:1 |

An aqueous catalyst solution of rhodium and the ligand was prepared. $Rh(OAc)_2$ was used as the rhodium source. This solution was added to the reactor with the above amount of isopropanol. Dicyclopentadiene was added and allowed to react at 5 MPa synthesis gas pressure and 130° C. for 3 h. The reaction was stopped. After cooling and depressurizing the autoclave, the isopropanol was removed from the reaction mixture at 100 mbar and 40° C. Subsequently, the residue was placed in a phase separator, allowing the separation of the catalyst and product phases. The product phase was analyzed by GC. The following composition was obtained:

| Ingredient (without solvent) | surface % |
|---|---|
| head | 0.48 |
| DCP | 1.50 |
| TCD monoenal isomers | 3.38 |
| TCD dial isomers | 89.92 |
| TCD-OH | 2.20 |
| tail | 2.52 |

The results are obtained without considering the solvent content. The results show that almost 100% conversion was achieved with a very low catalyst concentration of 0.45 mol % based on the diolefin. Moreover, a TCD dial selectivity of about 90% was obtained. The aqueous catalyst solution used could be used in several experiments (n>5) without loss of reactivity. This is an indication that the process according to the invention can apparently also protect the catalyst from decomposition.

FIG. 1 shows the result of the calculated phase behaviour of a three-component mixture as a function of composition at a temperature of 120° C. The components are the aqueous solution of a Rh-TPPTS complex catalyst (bottom left), isopropanol as solvent (top) and the final product TCD dial (bottom right). The dashed region includes the mass fractions of the ternary compositions, which are two-phase at this temperature. In the non-dashed, upper region of the triangle, compositions are present which are single-phase under the pressure and temperature conditions. Since the solubilities of the olefin reactants are not significantly different from the solubilities of the intermediates and end products, this phase diagram is representative of the entire reaction with changing reactant/product ratios.

Further tests were carried out with other solvents and reactants. The test conditions for these tests are as follows:

| Components | Application quantities |
|---|---|
| Total rhodium concentration in aqueous catalyst solution | 46380 mg/L |
| Amount of aqueous catalyst solution in mL | 4.20 |
| Rhodium in mmol | 1.89 |
| Ligand quantity in g | 35.68 |
| Ligand concentration in mmol/kg | 530 |
| P/Rh ratio | 10:1 |
| Olefin in % based on total input | 10 |
| Olefin in g | 50 |
| Olefin in mol | 0.378 |
| Rhodium quantity in % based on olefin | 0.5 |
| Quantity of isopropanol used in g | 225 |
| Quantity of water used in g | 225 |
| Synthesis gas composition H2:CO | 1:1 |

In deviation from the reaction conditions given above, n-propanol was used instead of isopropanol. Without optimizing the experimental conditions for the use of n-propanol, the reaction of dicyclopentadiene gives a TCD dial product fraction of 61.3% and an olefin conversion of 99.9%. This shows that the reaction can also be carried out in non-branched alcohols as solvents.

The reaction was repeated under the same process conditions as indicated above. In deviation, 20 g of methylcyclohexane (MCH) were additionally added as solvent. Without optimizing the experimental conditions for the use of this solvent mixture, the TCD dial product fraction is 69.15% and the olefin conversion is 99.5%. This shows that the reaction can also be carried out in solvent mixtures.

The reaction was repeated under the same process conditions as described above. In deviation from the reaction, 1-octene was now used as the olefin component instead of dicyclopentadiene. Without optimizing the experimental conditions to use a different olefin, the yield of the C9 aldehyde target components is 83.6% and the olefin conversion is 98%. This shows that the reaction can also be carried out with non-cyclic monoolefins.

The invention claimed is:

1. Process for the preparation of polycyclic aliphatic dialdehydes by hydroformylation of polycyclic aliphatic diolefins in the presence of synthesis gas over a metal catalyst system modified with organophosphorus ligands with a transition metal of the $8^{th}$-$10^{th}$ subgroup, characterized in that the hydroformylation is carried out by means of a water-soluble diphosphine or triarylphosphine complex catalyst at a pressure of greater than or equal to 0.5 MPa and less than or equal to 10 MPa and at a temperature of greater than or equal to 70° C. and less than or equal to 150° C. in a homogeneous liquid reaction phase, the homogeneous liquid phase comprising at least one non-aqueous solvent, olefins and/or their mono-and/or dialdehydes as reaction products and an aqueous catalyst solution, the mass ratios of these components in the solution being controlled so as to obtain a single-phase solution under the reaction conditions.

2. The process according to claim 1, wherein the polycyclic aliphatic diolefin is selected from the group consisting of bi-cyclic or tri-cyclic dienes or mixtures thereof.

3. The process according to claim 1, wherein the polycyclic aliphatic diolefin is selected from the group consisting of dicyclopentadiene or norbornadiene.

4. The process according to claim 1, wherein the temperature and the pressure are kept constant during the reaction and the single phase of the reaction solution is adjusted via the mass ratios of solvent to aqueous catalyst solution.

5. The process according to claim 1, wherein the solvent is selected from the group consisting of straight or branched C2-C5 alcohols or mixtures of at least two alcohols from this group.

6. The process according to claim 1, wherein the solvent is isopropanol.

7. The process according to claim 1, wherein the metal catalyst is present in a concentration of greater than or equal to 0.05 mol and less than or equal to 0.75 mol in the reaction solution.

8. The process according to claim 1, wherein the reaction is carried out at a pressure of greater than or equal to 2.5 MPa and less than or equal to 7.5 MPa.

9. The process according to claim 1, wherein the mass ratio of aqueous catalyst solution to solvent, expressed as mass of catalyst solution divided by mass of solvent, is greater than or equal to 0.25 and less than or equal to 4.

10. The process according to claim 1, wherein the reaction is carried out at a temperature greater than or equal to 120° C. and less than or equal to 150° C.

11. The process according to claim 1, wherein the complex catalyst comprises triarylphosphine ligands and a catalyst metal, wherein the molar usage ratio of triarylphosphine ligands to catalyst metal, expressed as moles of triarylphosphine ligands divided by moles of catalyst metal, is greater than or equal to 8 and less than or equal to 15.

12. The process according to claim 1, wherein the pH of the aqueous catalyst solution is greater than or equal to pH 4 and less than or equal to pH 10.

13. The process according to claim 1, wherein the molar ratio of water in the used aqueous catalyst solution to catalyst metal, expressed as moles of water divided by moles of catalyst metal, is greater than or equal to 5000 and less than or equal to 60000.

14. The process according to claim 1, wherein the molar ratio of catalyst metal to polycyclic aliphatic diolefin, expressed as moles of catalyst metal to moles of diolefin, is greater than or equal to 0.05% and less than or equal to 0.75%.

15. The process according to claim 1, wherein at least one ligand of the water-soluble triarylphosphine complex catalyst comprises a triphenylphosphine-3,3',3"-trisulfonic acid sodium salt.

* * * * *